July 3, 1962 J. C. GARROTT 3,042,361
RUBBER-SEALED GATE VALVE
Filed March 21, 1960 2 Sheets-Sheet 1

John C. Garrott
INVENTOR.

BY

ATTORNEY

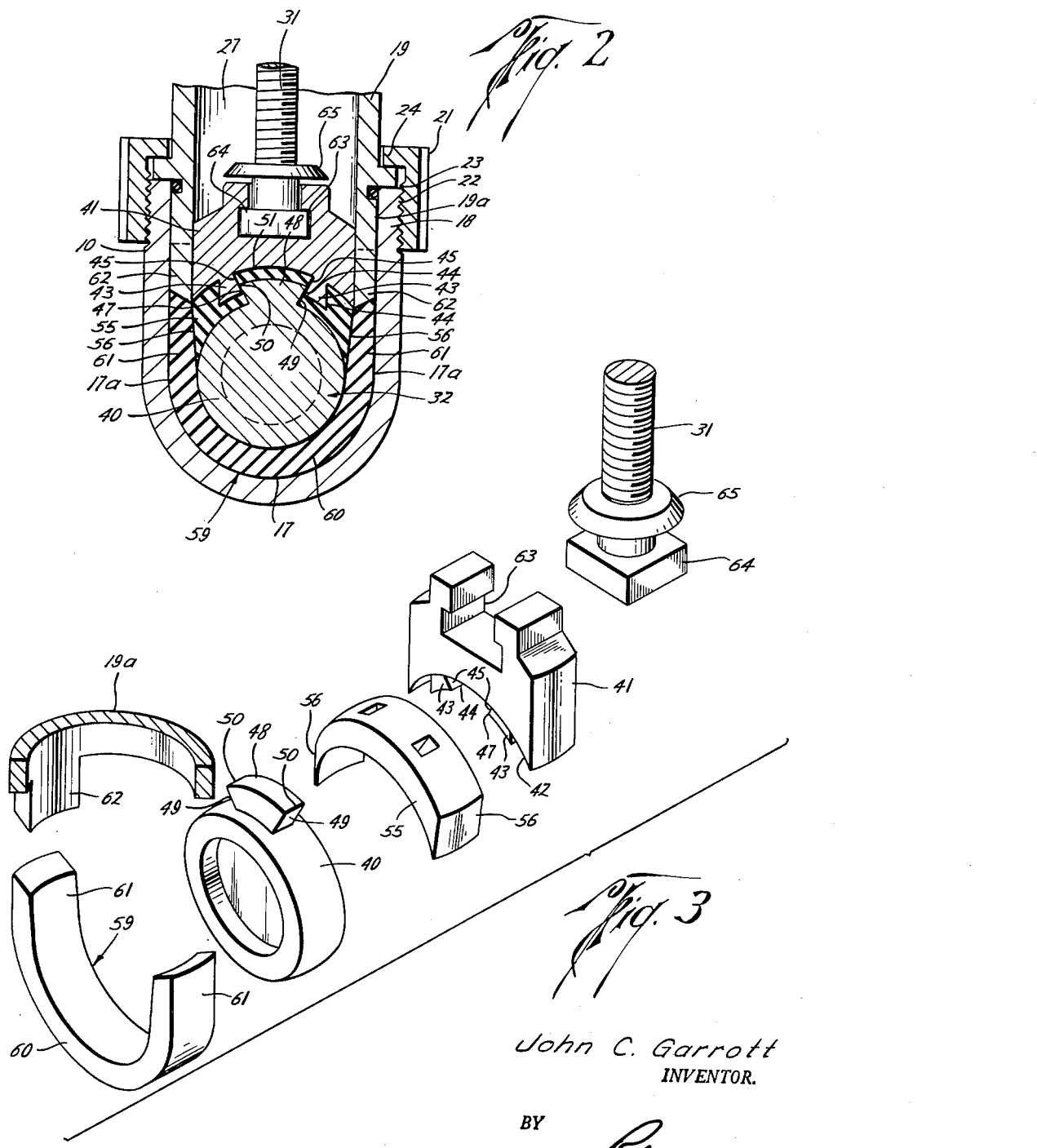

3,042,361
RUBBER-SEALED GATE VALVE
John C. Garrott, % Garrott Brass & Machine Co.,
P.O. Box 2204, Houston, Tex.
Filed Mar. 21, 1960, Ser. No. 16,240
8 Claims. (Cl. 251—187)

This invention relates to gate valves and more particularly to gate valves of the rubber-sealed type wherein the closure or gate member is enclosed or surrounded by flexible resilient sealing gaskets arranged to seal between the closure and the walls of the gate chamber surrounding the flow passages through the valve casing. Valves of this general type are illustrated in U.S. Patents Nos. 2,401,123 and 2,731,231.

In valves of the type described, it is frequently desirable, for sealing between the closure gate and the walls of the gate chamber about the flowway, to provide a sealing member which comprises two major portions, one of generally U-shape which forms a liner for the bottom and sides of the gate chamber surrounding the corresponding portions of the flowway, and a top portion which completes the seal about the remainder of the flowway. This latter portion is ordinarily mounted between two relatively movable sections of the gate body and vulcanized thereto, so that when the gate is moved to the closed position this portion will be compressed in order to complete the continuous seal about the gate body between the latter and the walls of the gate chamber surrounding the flow passages. When a structure of this kind is employed, it is found that under some operating conditions the sealing material will "freeze" to, or become vulcanized to, the walls of the gate chamber, so that when an effort is made to raise the gate to the open position, the force required may rupture the seal element connecting the two portions of the gate member, leaving the main closure portion in the closed position and thereby preventing opening of the valve.

It is a primary object of the present invention to provide a rubber-sealed gate valve of the general kind described which will overcome the difficulties of such valves as described above.

An important object is to provide a gate construction for gate valves employing a flexible sealing element between two portions of the gate, which is compressible on closing of the gate to form a seal about the upper portion of the gate between the latter and the gate chamber walls, but which will assure retraction of the gate under all conditions.

An additional object is to provide a gate construction for gate valves employing a two-part gate comprising a closure portion and a head portion normally spaced from the gate portion, the two portions being provided with co-operating connecting elements arranged to permit movement of the portions toward each other, while limiting movement in the opposite direction, to thereby prevent the portions from being pulled apart, both portions being secured to ecah other in their relatively spaced-apart positions by a flexible resilient seal member which is vulcanized directly to the gate portions and the connector members.

A further object is to provide a two-part gate construction as just described, in which the connector elements comprise dovetail shaped tongue and groove elements.

Other and more specific objects and advantages of this invention will become apparent from the following detailed description when read in conjunction with the accompanying drawings which illustrate one useful embodiment in accordance with this invention.

In the drawing:

FIG. 2 is a transverse cross-sectional view taken generally along line 2—2 of FIG. 1; and FIG. 3 is an exploded perspective view of the gate member and the sealing elements of the valve.

Figure 1:
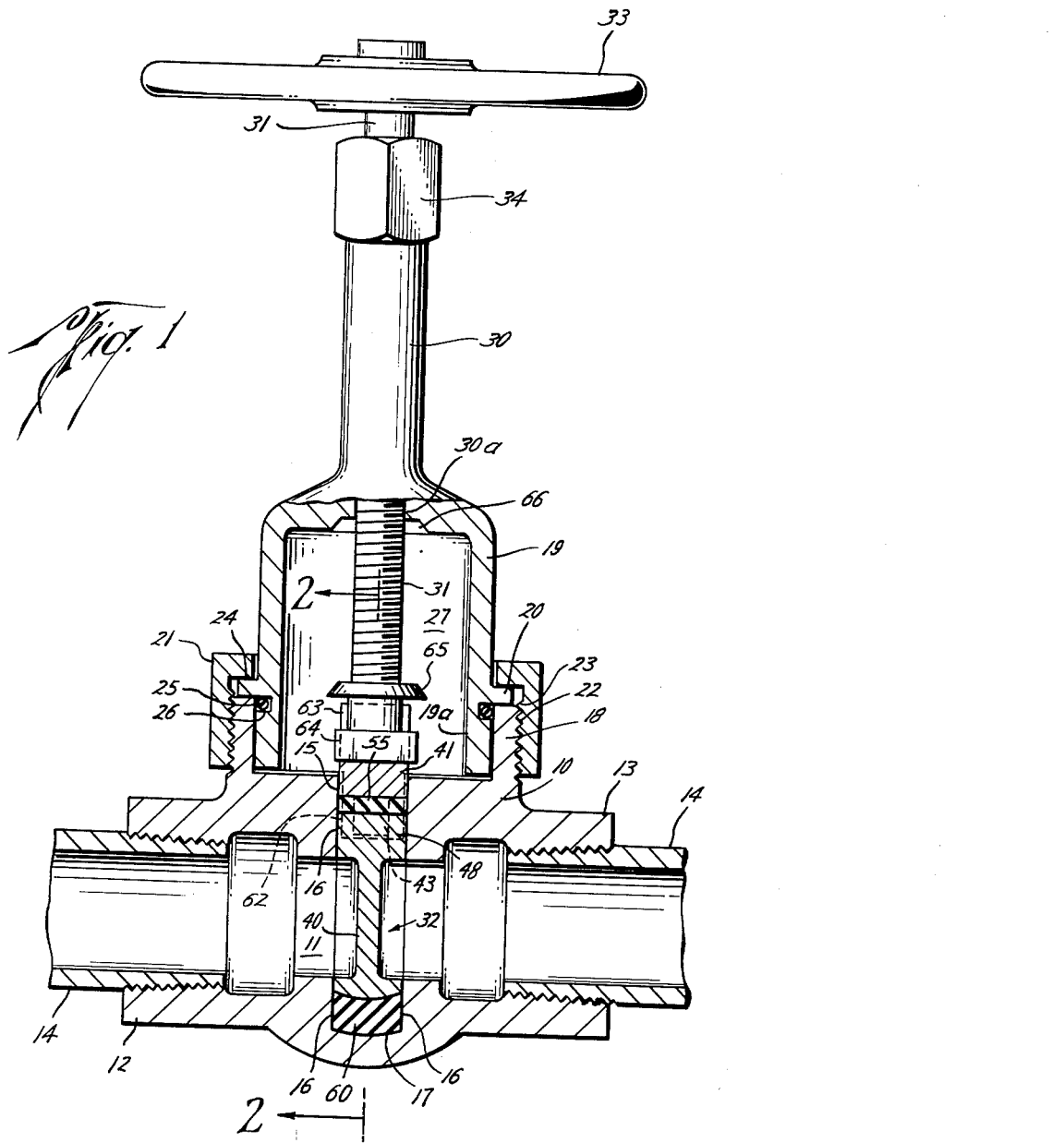
FIG. 1 is a longitudinal sectional view of a gate valve in accordance with one embodiment of the present invention, the closure gate being shown in the closed position.

A gate valve, as illustrated, comprises a casing 10 having a flowway 11 therethrough opening to the exterior of the body through the inlet and outlet connections 12 and 13, either one of which may be the inlet and the other the outlet. The inlet and outlet connections 12 and 13 may be internally threaded, as shown, for connecting the valve casing into a pipe line 14. It will be understood that flow connections 12 and 13 may be flanged rather than threaded, or provided with some other known type of connection elements by which the valve may be installed in a pipe line for controlling flow of fluid therethrough.

Flowway 11 is intersected by a gate chamber 15 defining the flow ports 12a and 13a in flowway 11 at opposite ends of chamber 15. The latter has a relatively narrow, generally rectangular shape, defined by parallel end walls 16—16 transverse to the axis of flowway 11, and a bottom wall 17 concentric with the flowway and merging into generally parallel side walls 17a on opposite sides of flowway 11. The upper end of casing 10 is provided with an upstanding circular flange 18. A bonnet 19, of generally tubular form, has at its lower end a tubular skirt 19a slidably receivable in the bore of flange 18 and is provided above skirt 19a with a radially outwardly extending annular flange 20 adapted to seat on the upper end of flange 18. A screw collar 21 is adapted to be screwed down around the exterior of flange 18, which is provided with external threads 22 engageable by the internal threads 23 on collar 21. The latter is provided, at its upper end, with an inwardly extending annular lip 24 which overhangs flange 20, so that when collar 21 is screwed down about flange 18, lip 24 will engage the upper end face of bonnet flange 20 and draw the bonnet tightly down against flange 18, thereby clamping the bonnet to the valve casing. Packing, such as an O-ring seal 25, is seated in a packing groove 26 in the exterior of bonnet skirt 19a below flange 20 to form a fluid-tight seal between the bonnet and casing flange 18. It will be understood that other conventional arrangements may be employed for securing bonnet 19 to valve casing 10.

Bonnet 19 is integrally formed with a tubular neck 30 having an axial bore 30a in which is rotatably installed a gate stem 31 of a generally conventional threaded form, employed for raising and lowering the gate member, designated generally by the numeral 32, for controlling fluid flow through flowway 11. Stem 31 extends through neck 30 and has its upper end secured to an operating wheel 33 by which the stem is rotated for raising and lowering gate 32. A gland nut 34 closes the upper end of neck 30 about stem 31 and it will be understood that the usual packing elements for sealing between the stem and the bonnet, while not shown, are enclosed within neck 30. The lower end of stem 31 projects into the interior of bonnet 19 which defines a chamber 27 forming an extension of gate chamber 15 to receive the gate member 32 when the latter is moved to its upper or flowway-opening position.

Gate member 32 comprises a generally circular closure portion 40 and a head portion 41, both being constructed of metal. Head portion 41 is generally rectangular in transverse section and has a lower end face 42 which is generally arcuate in shape and substantially concentric with the periphery of closure portion 40. The thickness of head portion 41 is substantially the same as the thickness of closure portion 40, so that the end faces of both portions will be substantially flush with each other when assembled. Also, the length of head portion 41 is slightly greater than the diameter of closure portion 40 and head portion 41 is radially spaced a short distance from the periphery of closure portion 40. Projecting from end face 42 of head portion 41 are a pair of angularly spaced-apart tongues 43—43 defining between them a groove 44. The opposed walls 45 of tongues 43 taper downwardly and inwardly toward each other, thereby defining a dove-tail shape for groove 44. The outer ends of walls 45, by reason of the sloping configuration thereof, define shoulders 47—47 which form the margins of groove 44. Projecting upwardly from the periphery of closure portion 40 is a tongue 48 of dove-tail configuration complementary generally to the shape of groove 44, and having upwardly and outwardly tapering end walls 49—49 complementary to walls 45—45 and defining at their margins the shoulders 50—50 which are engageable with shoulders 47—47 to prevent head 41 from being pulled completely away from closure portion 40 when tongue 48 is seated in groove 44. Tongues 43—43 and 48 are preferably of lesser thickness than the gate portions and are centrally located with respect to the ends of these portions, as shown. The tongue-and-groove connections, as defined by tongue 48 and groove 44, between closure portion 40 and head 41, are dimensioned so that a limited degree of relative movement may occur between closure portion 40 and head 41 in the plane of the gate member while shoulders 47 and 50 will be operable to prevent complete separation of the head from the closure portion.

A seal element 55, constructed of a suitable flexible resilient material, preferably oil-resistant rubber or the like, is interposed between the closure portion 40 and head 41 and is vulcanized or molded directly thereto to form a compressible resilient connection between these gate portions. Of course, in vulcanizing the seal to the gate portions, the sealing material will fill all of the spaces between and about the connecting tongues 43—43 and 48 and the space between end face 42 and the adjacent portion of the periphery of closure portion 40, as well as the space between tongue 48 and the bottom of groove 44. In vulcanizing or molding sealing element 55 to the gate portions, the latter will be encased in a mold which will confine the sealing material to a thickness (considered axially of the gate member) which will make it flush with the ends of the gate member and to a length which will taper from that of end face 42 to the slightly lesser length corresponding to the diameter of closure portion 40, thereby defining the downwardly and inwardly tapering end faces 56, which at their upper ends project slightly beyond the diametric limits of closure portion 40.

The bottom 17 and side walls 17a—17a of the gate chamber are lined with a generally U-shaped gasket 59 comprising a curved bottom segment 60 and upwardly extending arms 61—61, adapted to seat, respectively, on bottom wall 17 and side walls 17a—17a of the gate chamber so as to surround the major portion of flowway 11, arms 61—61 extending upwardly along side walls 17a—17a to a point substantially above the axis of flowway 11. With this arrangement, when gate member 32 is moved to the flowway-closing position, as best seen in FIG. 2, end faces 56 of seal element 55 will sealingly engage the inner faces of the upper end portions of arms 61—61, the tapering configuration of end faces 56 acting to increase the compressive force between these sealing elements as the gate member moves inwardly of the gate chamber.

To prevent extrusion of the sealing material through the upper ends of the gate chamber 14 above the upper ends of arms 61—61, skirt 19a of the bonnet is provided with a pair of downwardly projecting fingers 62 complementary in shape and width to chamber 14 and substantially equal in thickness to the space between the ends of head 41 and the opposed side walls 17a of the gate chamber. Thus, when the gate member is moved to the closed position, the plastic sealing material comprising sealing element 55 and gasket 59 will be confined against extrusion by a metallic confining structure comprising head 41 and fingers 62 in cooperation with the metallic walls of gate chamber 14.

Head 41 is provided on its upper end with a T-slot 63 which is adapted to receive a square-sided key 64 mounted on the lower end of gate stem 31. The non-round surfaces of T-slot 63 and key 64 cooperate to provide a separable, relatively non-rotative connection between gate member 32 and the gate stem 31. The latter may also have formed thereon, at a point above key 64, a back-seal flange 65 adapted, when gate stem 31 is fully retracted, to engage an annular seat 66 formed at the juncture of bore 30a with chamber 27 in the bonnet.

In operation, when gate member 32 is moved to the flowway-closing position, closure portion 40 will enter between the arms 61 of gasket 59 and compressively engage these arms and bottom segment 60. At the same time sealing element 55 will enter between the upper end portions of arms 61—61. As downward pressure is applied by the gate stem through head 41 to the gate member, head 41 will be urged toward closure portion 40 when the latter has engaged the bottom of the gate chamber through gasket segment 60, and will act to compress sealing element 55 and thereby complete the seal between the gate member and the gate chamber about flowway 11. The relative movement between the head and closure portions of the gate member permitted by the relative shape of the connector elements, will permit the described compression of sealing element 55.

In the event gate member 32 is kept in the closed position for long periods of time or under conditions which tend to cause sealing element 55 to "freeze" to the walls of the gate chamber, then the metal-to-metal engagement provided by shoulders 47 and 50 will permit sufficient retractive force to be applied to the gate member through stem 31 to retract the gate member without rupturing sealing element 55.

Vulcanization of sealing element 55 to head 41 and closure portion 40 of the gate and to and about the connector elements extending therebetween, results in a unitary composite gate structure composed of spaced metallic segments and a flexible resilient sealing element interposed between the metallic gate portions which is compressible therebetween to form a seal about the gate member, the gate portions being inter-connected by connector elements cooperating to permit limited relative movement between the portions while preventing complete separation of the portions.

It will be understood the various alterations and changes may be made in the details of the illustrative embodiment within the scope of the appended claims without departing from the spirit of this invention.

What I claim and desire to secure by Letters Patent is:

1. A gate valve comprising a casing having a flow passage therethrough, a gate chamber intersecting said flow passage, a generally U-shaped flexible gasket seated in the bottom of the gate chamber and extending upwardly along opposite sides thereof about said flow passage, a gate member shaped to interfit with said gasket movably mounted in the gate chamber for controlling said flow passage, said gate member comprising a closure portion and a head portion spaced above the closure portion, inter-engaged connector elements integral with said portions and co-operatively shaped to permit limited relative movement of the portions in the plane of the gate member, a flexible resilient member interposed between said portions and molded directly to said portions and to said connector elements completely enclosing said connector elements, said flexible resilient member being compressible between said portions by movement of the head portion toward the closure portion to seal between the gate member and the enclosing walls of the gate chamber, a bonnet member closing said gate chamber and having portions closing the spaces between the walls of said chamber and the adjacent ends of said head portion above the upper ends of the arms of said gasket, and an operating stem extending into said gate chamber and connected to said head portion.

2. A gate valve according to claim 1, wherein said connector elements comprise tongues and grooves having inter-engageable shoulder elements relatively positioned to permit said limited relative movement.

3. A gate valve according to claim 1, wherein said connector elements comprise dove-tail shaped tongues and grooves.

4. A gate valve according to claim 1, wherein said closure portion is generally circular and said head portion is arcuate and generally concentric with said closure.

5. A gate valve according to claim 1, wherein the stem and head portion are connected together by separable, relatively non-rotatable coupling elements.

6. A gate valve comprising a casing having a flow passage therethrough, a gate chamber intersecting said flow passage, a generally U-shaped flexible gasket seated in the bottom of the gate chamber and having its arms extending upwardly along opposite sides of the gate chamber about said flow passage to points above the flow passage, a gate member shaped to interfit between the arms of the gasket movably mounted in the gate chamber for controlling said flow passage, said gate member comprising a generally circular closure portion and a head portion spaced above the closure portion, inter-engaged connector elements integral with said portions and cooperatively shaped to permit limited relative movement of the portions in the plane of the gate member, said connector elements having inter-engageable shoulder portions preventing complete separation of the head portion from the closure portion, a flexible resilient member interposed between said portions and molded directly to said portions and to said connector elements completely enclosing said connector elements, said resilient member being positioned on the gate member to enter between the upper ends of the arms of said gasket when the gate member is moved to the flow passage-closing position, said resilient member being compressible between said portions and said arms by movement of the head portion toward the closure portion to seal between the gate member and the enclosing walls of the gate chamber above the flowway, a bonnet member closing said gate chamber and having portions closing the spaces between the walls of the gate chamber and the adjacent ends of said head portion above said upper ends of the arms of said gasket, and an operating stem extending through said bonnet into the gate chamber and operably connected to said head portion.

7. A gate valve comprising a casing having a flow passage therethrough, a gate chamber intersecting said flow passage, a generally U-shaped flexible gasket seated in the bottom of the gate chamber and having its arms extending upwardly along opposite sides of the gate chamber about said flow passage to points above the flow passage, a gate member shaped to interfit between the arms of the gasket movably mounted in the gate chamber for controlling said flow passage, said gate member comprising a generally circular closure portion and a head portion spaced above the closure portion, inter-engaged connector elements integral with said portions and cooperatively shaped to permit limited relative movement of the portions in the plane of the gate member, said connector elements having inter-engageable shoulder portions preventing complete separation of the head portion from the closure portion, a flexible resilient member interposed between said portions and molded directly to said portions and to said connector elements completely enclosing said connector elements, said resilient member being positioned on the gate member to enter between the upper ends of the arms of said gasket when the gate member is moved to the flow passage-closing position, said resilient member being compressible between said portions and said arms by movement of the head portion toward the closure portion to seal between the gate member and the enclosing walls of the gate chamber above the flowway, said casing having a circular bonnet-receiving opening surrounding the upper end of the gate chamber, a bonnet having an annular skirt receivable in said opening, means releasably securing said bonnet to said casing, a pair of diametrically spaced fingers projecting downwardly from said skirt into the gate chamber into abutting engagement with the upper ends of said arms of said U-shaped gasket, said fingers having a width and thickness to slidably interfit the gate chamber space between the walls of the gate chamber and the adjacent ends of said head portion.

8. A gate valve according to claim 7 wherein said connector elements comprise tongues-and-grooves having inter-engageable shoulder elements relatively positioned to permit said limited relative movement.

References Cited in the file of this patent

UNITED STATES PATENTS

| | | |
|---|---|---|
| 2,401,123 | Volpin | May 23, 1946 |
| 2,563,992 | De Grave | Aug. 14, 1951 |
| 2,718,371 | Erdman | Sept. 20, 1955 |
| 2,911,188 | Anderson | Nov. 3, 1959 |

FOREIGN PATENTS

| | | |
|---|---|---|
| 782,003 | France | Mar. 11, 1935 |